United States Patent [19]
Goor et al.

[11] Patent Number: 5,468,047
[45] Date of Patent: Nov. 21, 1995

[54] CHILD SAFETY SEAT

[75] Inventors: Dan Goor; Robert P. Harnisch; Robert L. Browne; Stephen T. Long, all of Colorado Springs, Colo.

[73] Assignee: GA International, Inc., Colorado Springs, Colo.

[21] Appl. No.: 201,200

[22] Filed: Feb. 24, 1994

[51] Int. Cl.⁶ .............................. A47C 1/08; A47C 7/62; B60N 2/42
[52] U.S. Cl. .................. 297/250.1; 297/184.13; 297/216.12; 297/256.15; 297/487
[58] Field of Search ................ 297/184.13, 250.1, 297/216.12, 256.15, 396, 487, 468, 484

[56] References Cited

U.S. PATENT DOCUMENTS

| | | | |
|---|---|---|---|
| 4,027,915 | 7/1977 | Anderson et al. | 297/184.13 |
| 4,440,331 | 4/1984 | Schimmels | 297/184.13 |
| 4,579,385 | 4/1986 | Koenig | 297/184.13 |
| 4,583,780 | 4/1986 | Finn | 297/184.13 |
| 4,834,420 | 5/1989 | Sankrithi et al. | 280/728 |
| 5,322,343 | 6/1994 | Parker et al. | 297/184.13 |

*Primary Examiner*—Kenneth J. Dorner
*Assistant Examiner*—Anthony D. Barfield
*Attorney, Agent, or Firm*—Weingarten, Schurgin, Gagnebin & Hayes

[57] ABSTRACT

A child/infant safety seat provides improved occupant protection, especially in a vehicle equipped with a passenger-side air bag when the seat is positioned with the occupant facing rearward. The safety seat includes a head protector configured to deflect a forward facing portion of the seat downward upon interaction with an inflating air bag. The child safety seat, when occupied, has a center of gravity that causes a belt retaining the seat to be tightened for proper retention of the child seat during a collision and subsequent air bag inflation. The child safety seat can include one or more longitudinal members to strengthen the seat, provide additional head and torso protection, and transfer impact forces away from the head protector.

9 Claims, 3 Drawing Sheets

5,468,047

CHILD SAFETY SEAT

FIELD OF THE INVENTION

The present invention relates to a child safety seat, and more particularly a child safety seat for vehicular use.

BACKGROUND OF THE INVENTION

All fifty states have laws requiring infants and small children to be restrained while in an operating motor vehicle. In many states, these laws mandate the use of a child safety seat for children up to the age of four years. In recent years, an increasing number of vehicles have been equipped with passenger-side air bags; and by 1996 it is expected that all automobiles produced in the United States will be so equipped.

Although child seat manufacturers routinely warn purchasers to secure the child safety seat in the center of the rear-seat, it is not uncommon for the seat to be placed in the front, passenger-side seat. However, the failure to follow the manufacturer's instructions presents a serious safety risk to a child in the improperly installed safety seat, especially when the child is within a height and weight range wherein it is recommended to position the child seat in a rearward facing manner. Alarmingly, the safety risk to a child seated in a rearward facing seat is even greater when a car is equipped with a passenger-side air bag.

Various studies have shown that the interaction between a rear facing infant seat and a front passenger-side air bag can result in excessive head and chest acceleration, causing serious and perhaps fatal injury to an infant occupant. For example, the air bag/seat interaction produces accelerations of an infant's head exceeding 100 G's at bag impact and Head Injury Criterion (HIC) values ranging from 650 to 1300. By contrast, rear facing seats not experiencing air bag interaction produce head accelerations of about 50 G's and HIC values generally less than 300 when crash tested at a standardized test speed of 48 km/hr. Interestingly, one study has noted that head acceleration remains high in the presence of a rear facing child seat/air bag interaction regardless of the level of crash severity.

It would therefore be desirable to provide a child safety seat that will protect a child despite improper installation of the safety seat in the front-seat, or improper tensioning of restraint belts, especially when the safety seat is rearward facing.

SUMMARY OF THE INVENTION

The present invention overcomes the disadvantages described above by providing improved occupant protection in all vehicles, and especially vehicles equipped with a passenger-side air bag. The child safety seat includes a head protector configured to deflect a forward facing (with respect to the interior of a vehicle) portion of the seat downward upon interaction with an inflating air bag, while reducing the force per unit area in the region of air bag interaction. The weight distribution of the safety seat causes a belt retaining the safety seat to be tightened for proper retention of the child safety seat during a collision and subsequent air bag inflation.

In an exemplary embodiment, a child safety seat includes a base having ends that define a plane. A backrest is secured to the base at an obtuse angle with respect to the plane, and a head protector is secured to the backrest at an acute angle with respect to the plane. A longitudinal member, such as a U-shaped bar, can be secured to the head protector and a portion of the base.

BRIEF DESCRIPTION OF THE DRAWING

The invention will be more fully understood by reference to the following detailed description when considered in conjunction with the accompanying drawings, in which.

DETAILED DESCRIPTION OF THE PREFERRED EMBODIMENT

Figure 1:
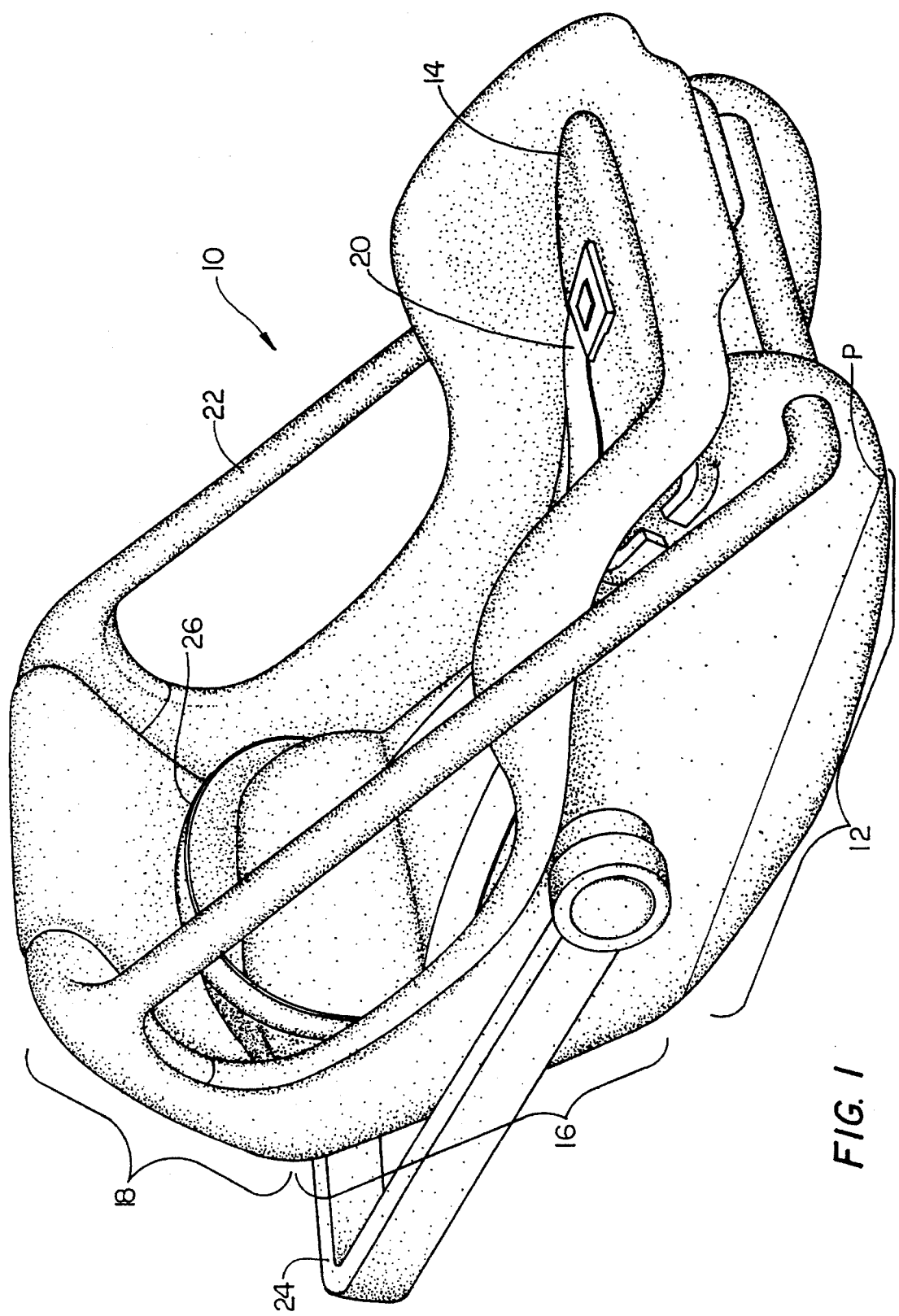
FIG. 1 is a perspective view of a child safety seat of the invention.

FIG. 1 is a perspective view of a child safety seat 10 of the present invention. The child safety seat 10 includes a base 12 having a first end and a second end, wherein a plane "P" is defined by the two ends. The base defines a cavity into which padded seating cushions 14 are disposed, the base 12 being either secured to or integrally formed with a backrest 16 disposed at an obtuse angle with respect to the plane defined by the ends of the base. A head protector 18 extends outwardly from the backrest 16 at an acute angle with respect to the plane "P," wherein the acute angle is selected to orient the head protector 18 with respect to a normal inflation direction of an air bag (not shown) so as to present a surface against which the air bag can make contact in a predictable manner as it inflates. The head protector 18 can either be secured to the backrest 16 or formed integrally therewith. One or more seatbelts 20 are provided to secure an infant into the child safety seat 10.

As illustrated in FIG. 1, two members 22 extend longitudinally from the head protector 18 to a portion of the base 12 proximate the end of the base opposite the head protector. In the exemplary embodiment, the members comprise a U-shaped bar having a central region that passes through apertures, such as holes, in the base 12. The bar can have a sponge-like texture or be covered with padding. In addition to providing a "cage" that further protects the head and torso of an infant, the members 22 reinforce the head protector 18, and transfer impact energy from the region of the head protector toward the opposite end of the base 12. Although, other embodiments of the members 22 are contemplated, such as solid sides or a more completely enclosed upper portion, the illustrated embodiment of the safety seat 10 provides excellent visibility of and for the infant.

Additionally, while the longitudinal members 22 provide sturdy hand grips for carrying the safety seat 10 when it is not in a vehicle, an adjustable carrying handle 24, movable through a range of lockable positions from that shown to upright, can also be provided. The carrying handle 24 can also be configured as an energy absorbing element which breaks in a controlled manner during a crash. Alternatively, the carrying handle 18 can be configured so that it moves with respect to the base 12, wherein the movement is inhibited to a preselected degree by resistive elements. The carrying handle 24 has further utility in that it can also serve as a leveling leg for the safety seat 10 to accommodate seat inclinations that differ from car to car.

Figure 2:
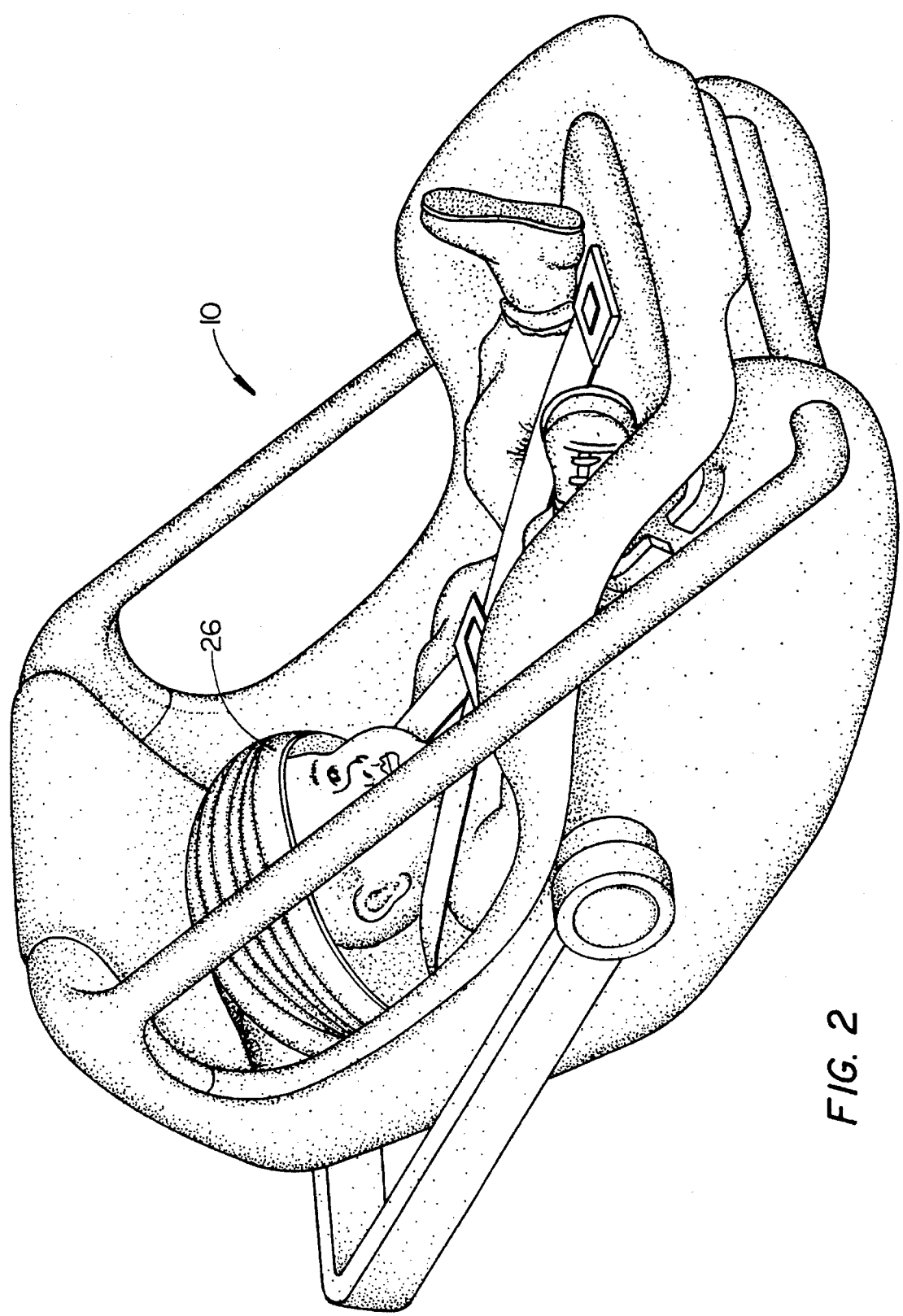
FIG. 2 is a perspective view of the child safety seat of FIG. 1 that illustrates an infant positioned within the seat and having an engaged supplemental head restraint.

Continuing to refer to FIG. 1, a supplemental head restraint 26 is illustrated that is movable between a rearward or disengaged position, away from a child's head, to a forward or engaged position, over the child's head as shown in FIG. 2. In the illustrated embodiment, the supplemental head restraint 26 is pivotally secured to a portion of the backrest 16 and resembles a pliant cap. The supplemental head restraint 26 can either be positioned over the child's head when it is strapped into the child seat 10 or left in the disengaged position. If the supplemental head restraint 26 is in its disengaged state upon vehicle impact, it is urged toward and over the infant's head, thus further restraining the infant's head subsequent to vehicle impact.

FIG. 2 is an illustration of the inventive child safety seat 10 showing an infant correctly positioned within the seat and restrained by the seatbelts 20. The supplemental head restraint 26 is illustrated in its engaged state over the infant head. It should also be noted that the supplemental head restraint 26 is an excellent sun shield for the infant's head.

Figure 3:
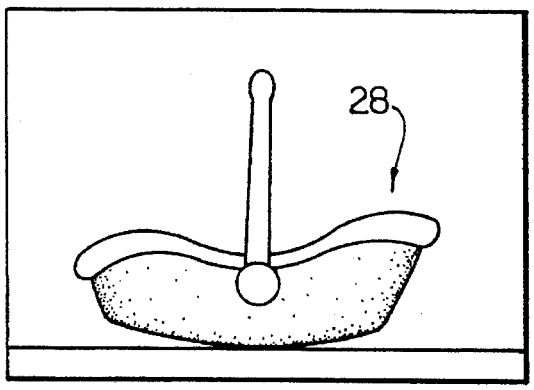
FIG. 3 is a side view of a prior art safety seat.
Figure 4:
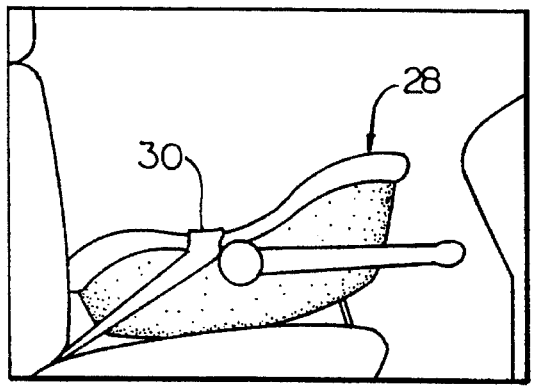
FIG. 4 is a side view of the prior art safety seat of FIG. 3 installed in a front-seat of a vehicle equipped with a passenger-side air bag.
Figure 5:
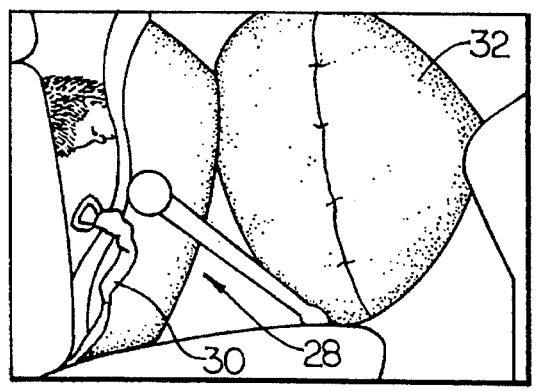
FIG. 5, is a side view of the prior art safety seat illustrated in FIG. 4 during air bag inflation.

To better understand the advantages of the inventive child safety seat 10, FIGS. 3, 4, and 5 illustrate the contrasting structure and behavior of a conventional child seat during a crash in a vehicle equipped with a passenger-side air bag. FIG. 3 is a side view of a prior art child seat 28. FIG. 4 illustrates the prior art child seat 28 positioned in a front, passenger side seat of a motor vehicle equipped with a passenger-side air bag. The child seat 28 is shown secured to the seat with a restraining belt 30.

FIG. 5 illustrates a typical interaction between the prior art child seat 28 and a passenger-side air bag 32 during a frontal collision. It should be especially noted that the forwardmost portion of the child seat 28, proximate the infant's head, catches the air bag 32 during air bag inflation. As the air bag 32 continues to inflate, it lifts the forwardmost portion of the child seat 28 upward causing the infant's head to be rapidly pushed toward the seat back. At this point the restraining belt 30 has become loose. Thus, as the air bag 32 deflates, the child seat 28 is able to recoil forward to the limit of the slack in the belt, further subjecting the infant to additional injurious acceleration and possible impact with the dashboard.

Figure 6:
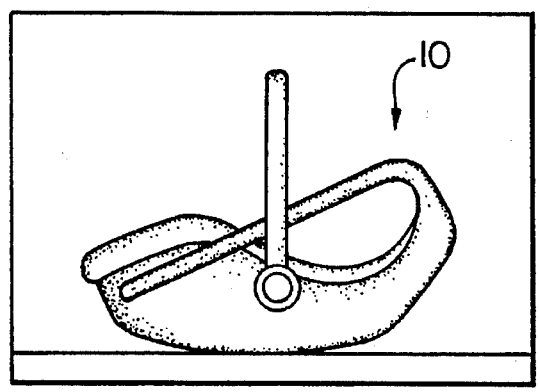
FIG. 6 is a side view of the child safety seat of the instant invention.
Figure 7:
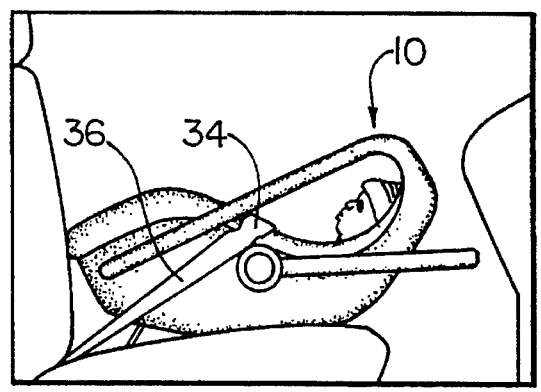
FIG. 7 is a side view of the child safety seat of FIG. 5 shown positioned in the front-seat of a vehicle having a passenger-side air bag.
Figure 8:
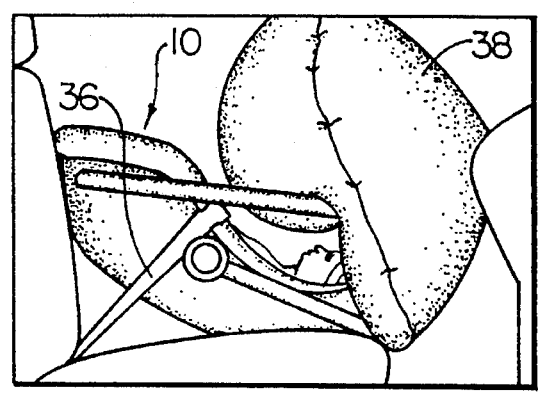
FIG. 8 is a side view of the child safety seat of the invention during passenger-side air bag inflation.

By contrast with the prior art child seat 28, FIGS. 6, 7, and 8 illustrate the advantageous child safety seat 10 of the invention. FIG. 6 is a side view of the safety seat 10, wherein several distinguishing features of the invention are readily apparent. Some of the distinguishing features including the head protector 18 and longitudinal members 22 which define a head and torso protecting cage, as well as provide for force transfer, have been discussed with respect to FIG. 1.

Additional distinguishing features of the child safety seat of the invention include a secure attachment, or restraining belt anchor point 34 for a restraining belt 36 at the juncture of the members 22 and the base 12, visible in FIG. 7, wherein the child safety seat 10 is shown strapped into the passenger-side, front seat of a vehicle having a passenger-side air bag. The illustrated configuration of the anchor point 34 ensures that the restraining belt 36 cannot slide off of the safety seat 10 as the safety seat moves forward during a frontal collision. It should also be noted that the child safety seat 10 is configured to raise the infant's feet and lower its head, in part to provide a center of gravity between the head protector 18 and the anchor point 34.

An advantage of this feature is shown in FIG. 8, wherein the child safety seat 10 is illustrated at one moment during the interaction between the safety seat 10 and an inflating air bag 38. As the air bag 38 inflates, it presses against the head protector 18 portion causing it to be thrust downward. The head protector 18 and the longitudinal members 22 prevent the air bag 38 from smothering the infant, yet permits it to remain proximate the infant's head in a protective relationship. As the contoured backrest 16 stabilizes on the vehicle seat, a large portion of the base 12 near the infant's feet is positioned against the vehicle seat back, thus aligning the longitudinal members 22 with a force vector imparted by the inflating air bag, thereby transferring energy from the head protector 14 to the vehicle seat with a reduced risk of seat failure. It should also be noted that downward rotation of the head protector 18 caused by interaction with the air bag 38 maintains the restraining belt 36 under tension. Thus, as the air bag 38 deflates, the child safety seat 10 moves minimally, further reducing the risk of injury to the infant. Notably, all of the above advantages can be obtained for a negligible manufacturing cost.

Although the invention has been shown and described with respect to exemplary embodiments thereof, various other changes, omissions and additions and form in detail thereof, may be made therein without departing from the spirit and scope of the invention.

What is claimed is:

1. A child safety seat comprising:

a base having a first end and a second end that define a plane;

a backrest secured to said first end of said base at an obtuse angle with respect to said plane;

a rigid head protector immobily secured to said backrest at an acute angle with respect to said plane defined by said base; and a longitudinal member secured to said head protector and a portion of said base proximate said second end of said base;

wherein said head protector has a first side and a second side, said longitudinal member is U-shaped having a first end and a second end, said first end of said longitudinal member being secured to said first side of said head protector, and said second end of said longitudinal member being secured to said second side of said head protector.

2. The child safety seat of claim 1, wherein said longitudinal member is a bar.

3. The child safety seat of claim 2, wherein said bar has a sponge-like surface texture.

4. The child safety seat of claim 2, wherein said bar is padded.

5. A child safety seat comprising:

a base having a first end and a second end that define a plane, said second end having an aperture therethrough;

a backrest secured to said first end of said base at an obtuse angle with respect to said plane;

a head protector having a first side and a second side, said head protector secured to said backrest at an acute angle with respect to said plane;

a U-shaped bar having a first end, a central portion, and a second end, said first end of said bar secured to said first side of said head protector, said second end of said bar secured to said second side of said head protector, and said central portion engaged with said aperture of said second end of said base; and a restraining belt anchor point;

wherein said child safety seat has a center of gravity between said restraining belt anchor point and said head protector when said child safety seat is occupied.

6. The child safety seat of claim 5, further comprising a supplemental head restraint movable between a first position and a second position.

7. The child safety seat of claim 6 wherein said supplemental head restraint includes a pliant cap pivotally engaged with said backrest.

8. The child safety seat of claim 5, wherein said bar has a sponge-like surface texture.

9. The child safety seat of claim 5, wherein said bar is padded

* * * * *